US009813777B1

(12) United States Patent
Nijim et al.

(10) Patent No.: US 9,813,777 B1
(45) Date of Patent: Nov. 7, 2017

(54) TIME SHIFTING CONTENT FOR NETWORK DVR AND TRICK PLAY KEYS

(71) Applicant: Cox Communications, Inc., Atlanta, GA (US)

(72) Inventors: Yousef Wasef Nijim, Roswell, GA (US); James Alan Strothmann, Johns Creek, GA (US); Jay Paul Langa, Cumming, GA (US)

(73) Assignee: COX COMMUNICATIONS, INC., Altanta, GA (US)

( * ) Notice: Subject to any disclaimer, the term of this patent is extended or adjusted under 35 U.S.C. 154(b) by 0 days.

(21) Appl. No.: 14/634,067

(22) Filed: Feb. 27, 2015

(51) Int. Cl.
H04H 60/32 (2008.01)
H04N 7/10 (2006.01)
H04N 7/025 (2006.01)
H04N 21/6587 (2011.01)
H04N 21/234 (2011.01)
H04N 21/239 (2011.01)
H04N 21/231 (2011.01)
H04N 21/258 (2011.01)
H04N 21/274 (2011.01)
H04N 21/25 (2011.01)
H04N 21/472 (2011.01)
H04N 21/2343 (2011.01)

(52) U.S. Cl.
CPC ..... H04N 21/6587 (2013.01); H04N 21/2393 (2013.01); H04N 21/23106 (2013.01); H04N 21/23406 (2013.01); H04N 21/234363 (2013.01); H04N 21/251 (2013.01); H04N 21/25891 (2013.01); H04N 21/274 (2013.01); H04N 21/47217 (2013.01)

(58) Field of Classification Search
None
See application file for complete search history.

(56) References Cited

U.S. PATENT DOCUMENTS

2003/0165327 A1* 9/2003 Blair ............... H04N 5/783 386/344
2007/0140647 A1* 6/2007 Kusunoki ......... H04N 7/17318 386/344
2008/0086743 A1* 4/2008 Cheng ............. H04N 5/76 725/38

(Continued)

FOREIGN PATENT DOCUMENTS

WO WO 2013143618 A1 * 10/2013 ....... H04N 21/44204

Primary Examiner — William J Kim
(74) Attorney, Agent, or Firm — Merchant & Gould

(57) ABSTRACT

Decoupling a time shift buffer from content streams to allow faster trick mode response is provided. A TSB/DVR manager may be provided to manage user selection of trick play options while viewing linear or non-linear content streams from a network source. Indication of selection of a trick play option may be received and analyzed by the TSB/DVR manager. The content stream may be managed, such that one or more trick play content streams may be sent to an endpoint device. This provides a network trick play experience similar to the trick play experience when content resides locally. Further, the user's behavior and viewing patterns may be continually monitored and recorded to allow the system to send one or more trick play content streams prior to the user selecting the trick play option. An option to acquire and record missed portions of the content stream may also be provided.

20 Claims, 9 Drawing Sheets

(56) References Cited

U.S. PATENT DOCUMENTS

2010/0306401 A1* 12/2010 Gilson .................. H04N 5/765
709/231
2010/0329337 A1* 12/2010 Mulroy ................. H04N 5/783
375/240.13
2012/0170642 A1* 7/2012 Braness ............... G11B 27/005
375/240.01

* cited by examiner

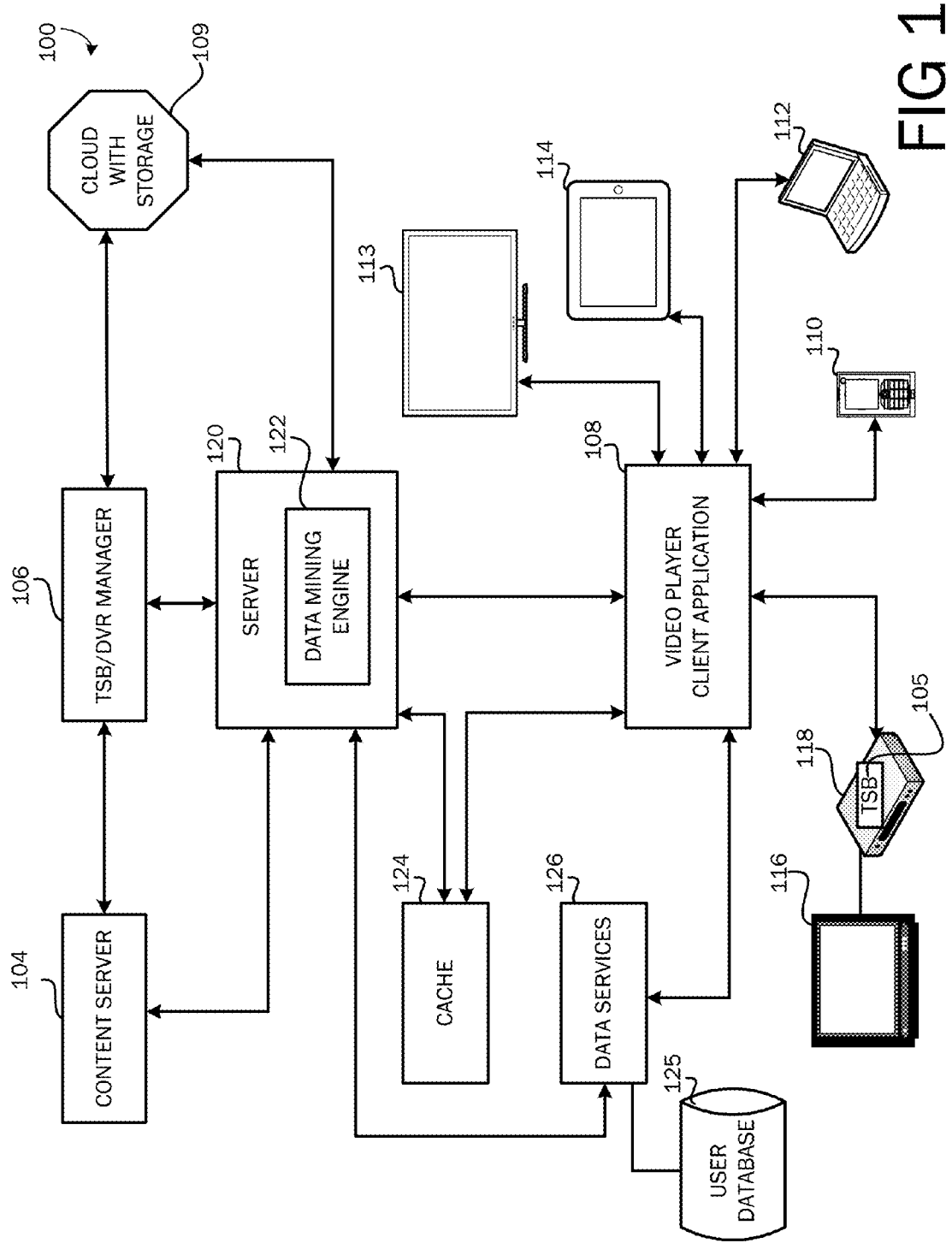

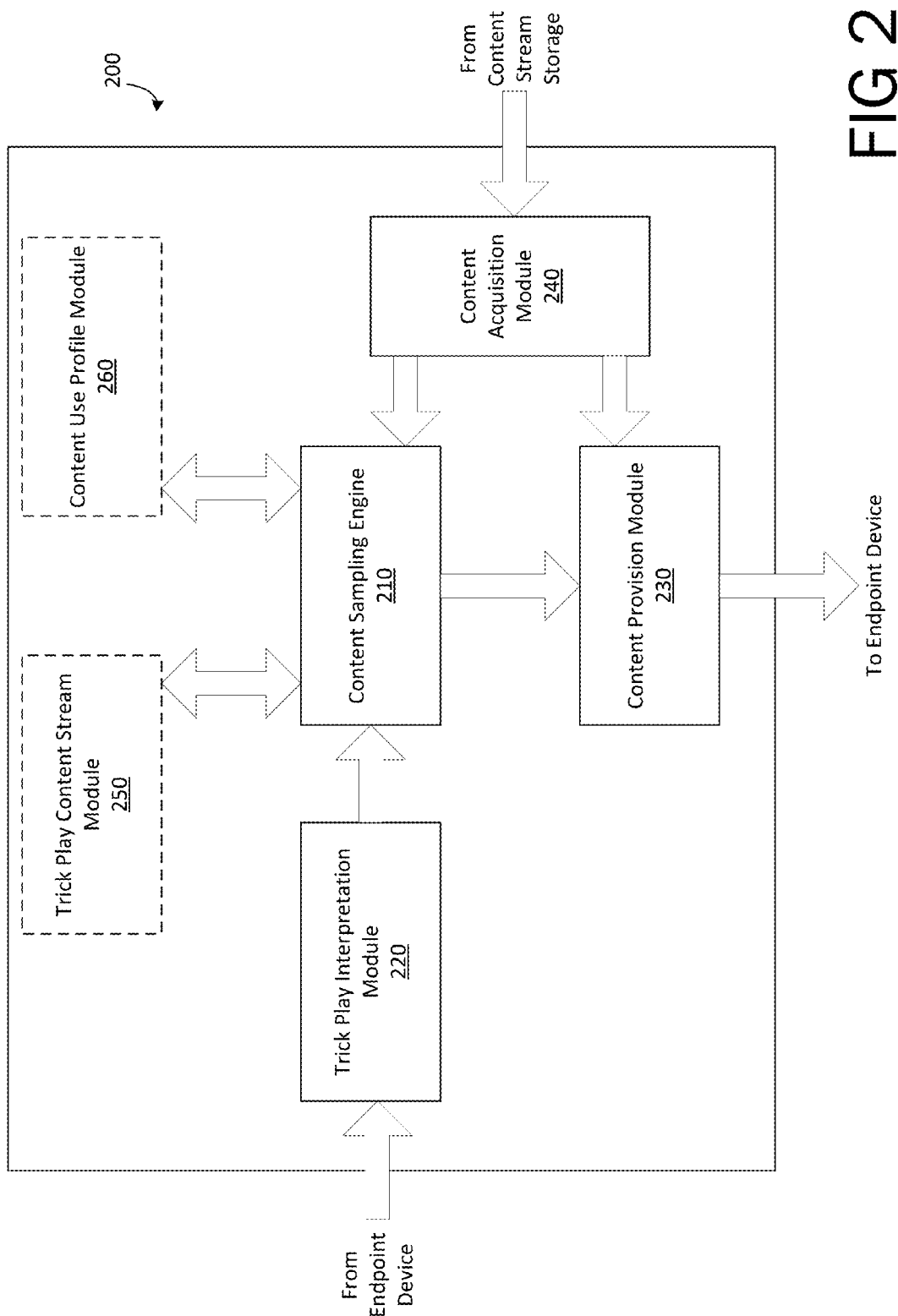

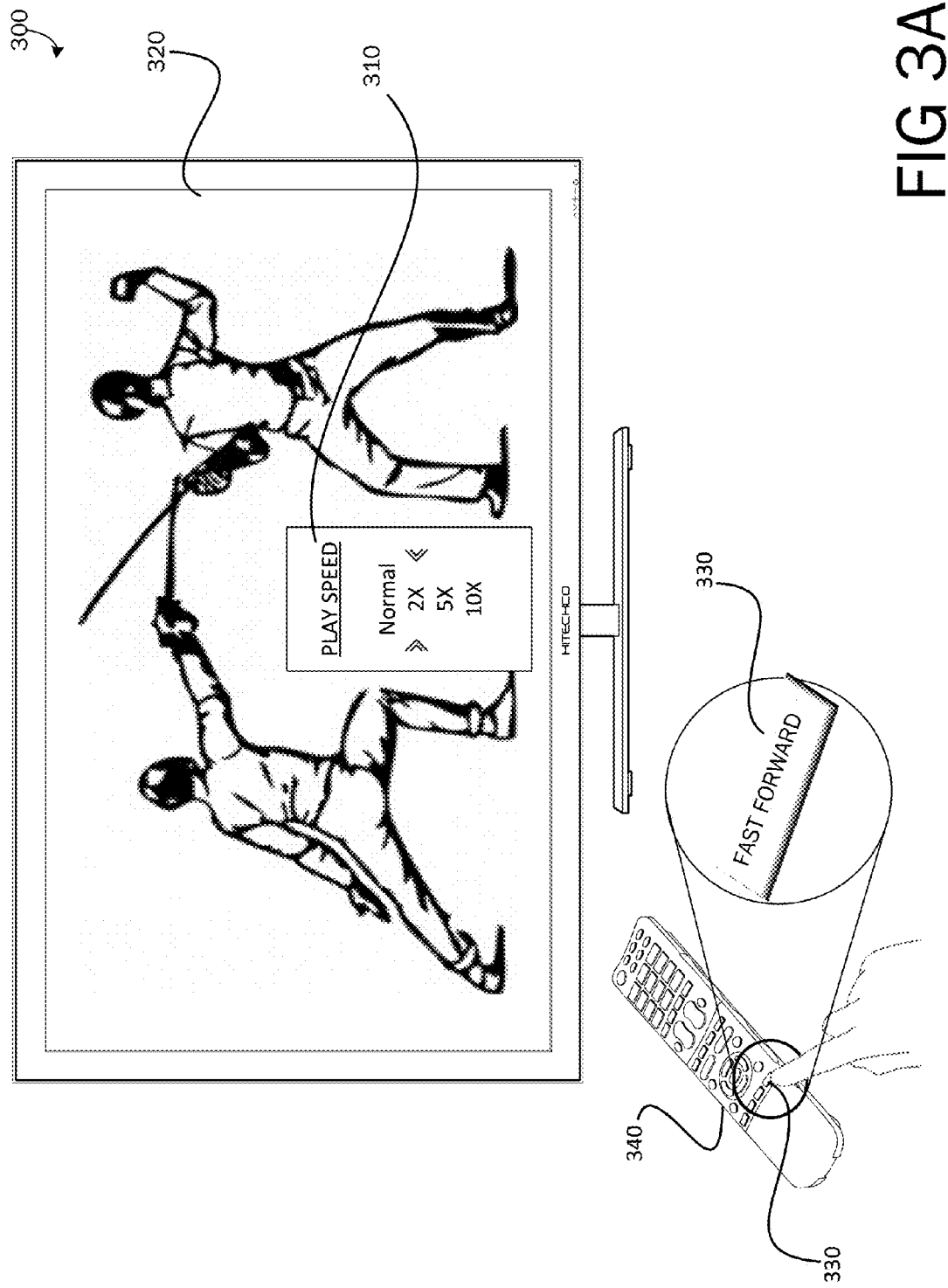

TIME SHIFTING CONTENT FOR NETWORK DVR AND TRICK PLAY KEYS

BACKGROUND

Video consumers are increasingly using digital video recorders (DVRs, also known as "personal video recorders," or PVRs) to record video content for later viewing. In addition, users are increasingly using both computers and mobile Internet Protocol (IP) devices such as smartphones and tablets to consume video content both in and out of their homes. Local DVRs and Network-based DVRs are both used to allow users to record and play content from their TV sets at home or from their various mobile devices.

One frequent frustration for many users is that when they try to access video content, located in the network DVR, there is usually a lag, especially when trying to use the trick play options such as rewind, fast forward, etc.

Users who frequently access video content from the network DVR do not have the same experience that they have while accessing content residing on their local DVR. The response rates of a local DVR are noticeably different than the response rates of a network DVR.

Further, as users may be surfing channels, they may come across a content stream that may already have started, which the users may wish to record. Existing systems provide users with the option to record from the point the users came across the content stream, not from the beginning of the content stream.

It is with respect to these and other considerations that the present invention has been made.

SUMMARY

Aspects of the present invention provide for decoupling the Time Shift Buffer (TSB) from the content allowing faster trick mode response. A TSB manager or a DVR manager may be provided to manage the users' requests as they select the trick play options while viewing linear content streams or non-linear content streams from a network DVR or other network source.

According to an aspect, while a user may select a trick play option, for example, fast forward, the user selection may be received and analyzed by the TSB/DVR manager. The content may be managed, such that one or more trick play content streams are sent to an endpoint device. This provides a network trick play experience similar to the trick play experience when the content resides locally. Further, the user's behavior and user's viewing patterns may be continually monitored and recorded to allow the system to send the one or more trick play content streams even prior to the user selecting a trick play option.

Further, according to another aspect, if the user decides to record a content stream after viewing it for a period of time, the user may be provided with a user interface with the option to record the content stream from the beginning point or from the currently displayed point. Certain aspects allow for the recording to start from the beginning of the content stream when the user has switched to a content stream after the content stream's start time, thus acquiring missed portions of the content stream for recording.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF DRAWINGS

Referring now to the drawings in which like reference numbers represent corresponding parts throughout:

FIG. 1 is a simplified block diagram of a system for decoupling a local TSB from content to allow for faster network-based trick play modes;

FIG. 2 is a simplified block diagram illustrating one embodiment of a system for decoupling a local TSB from content in response to trick play options;

FIG. 3A illustrates an example user interface for decoupling the TSB as the fast forward trick play option is selected.

DETAILED DESCRIPTION

Figure 3B:
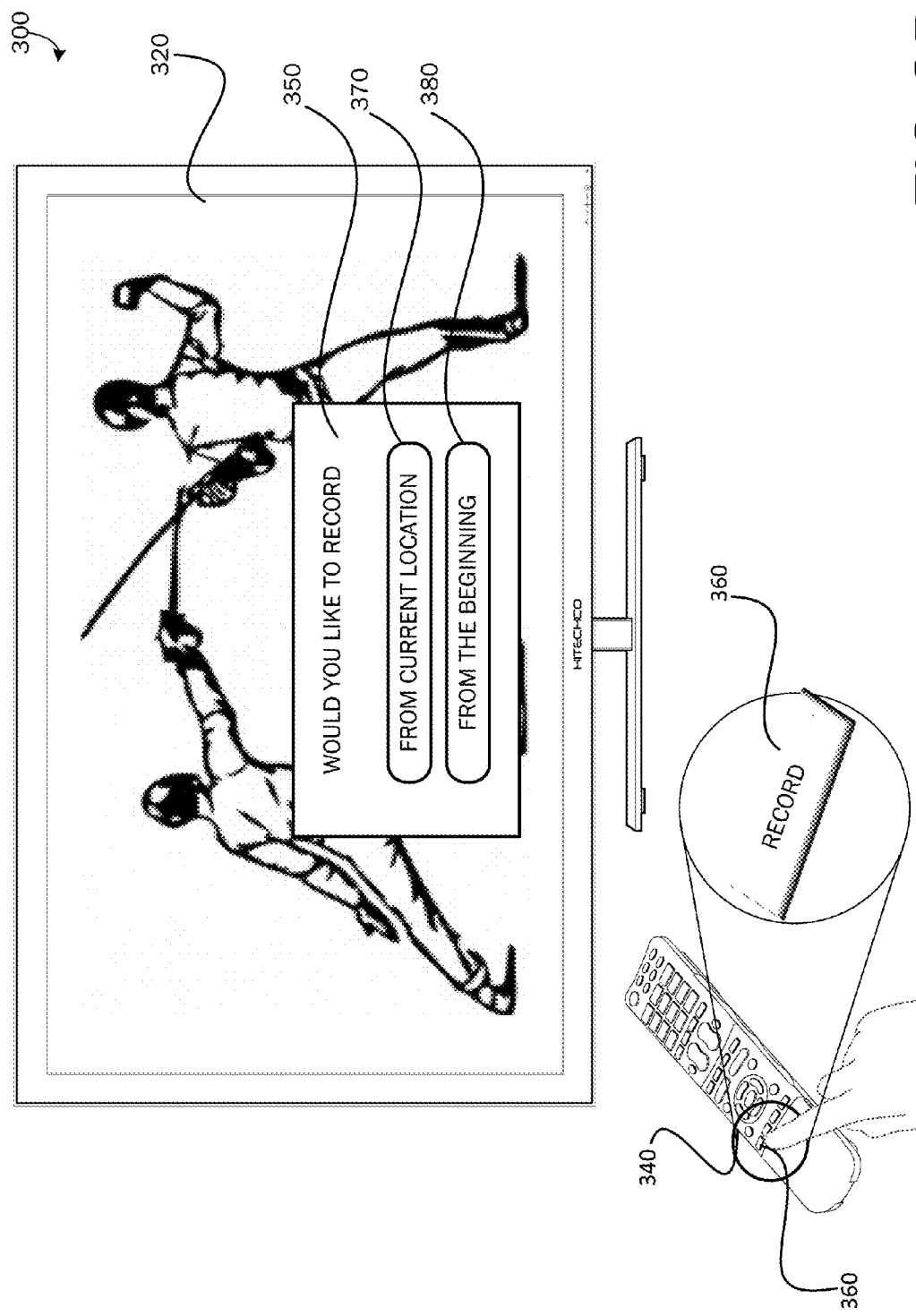
FIG. 3B illustrates an example user interface for decoupling the TSB as the record trick play option is selected.

Aspects are provided for decoupling the Time Shift Buffer (TSB) from content to allow faster trick play mode response. As a user may select a trick play option, (e.g., fast forward, rewind, pause, record, etc.), while viewing linear content streams or non-linear content streams from a network DVR, a TSB/DVR manager may receive, analyze, and manage the user request. The content may be managed, such that one or more trick play content streams may be sent to the endpoint device. The trick play content streams comprise selected frames of the content streams and associated audio data required to fulfill the user request. This provides a network trick play experience similar to the trick play experience when the content resides locally. Further, the user's behavior and user's viewing patterns may be continually monitored and recorded to allow the system to send the one or more trick play content streams even prior to the user selecting a trick play option.

According to another aspect, if a user decides to record a content stream after the broadcast has begun, a user interface providing an option to record the content from the beginning point or the current location may also be provided. Additional aspects provide for the recording to start from the beginning of the content stream when the user has switched to a content stream after the content stream's start time, thus acquiring missed portions of the content stream for recording These aspects may be combined, other aspects may be used, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is a simplified block diagram of a system 100 for decoupling a local TSB 105 from content to allow for faster network-based trick play modes, as described herein. Components of the system 100 may operate as a distributed system where each component is accessed via a suitable network, or the components may operate together as an integrated system. As illustrated, content server 104 is provided, which may include content streams, video content data, and metadata provided by the content owners/providers. The video content data and metadata may include information such as video content title, storyline, cast, genre, rating, release date, images, SAP options, etc.

A local TSB 105 is illustrated in FIG. 1 as part of an endpoint device, such as a set top box (STB) 118. The local TSB 105 is provided as part of the endpoint device so that content streams and other data can be queued locally on the endpoint device for display, playback, recording, or other processing while compensating for inconsistencies in the transmission speed of a service provider's Content Delivery Network (CDN) by having some amount of content available to buffer periods of lower transfer speed than display speed. Trick play options, such as fast forward, can also create the condition of a lower transfer speed relative to display speed. If a period of lower transfer speed than display speed lasts for a long enough period of time, the local TSB 105 may be exhausted and the user will experience lag or buffering as the local TSB 105 is repopulated with remaining portions of a content stream. The local TSB 105 of the system 100 is therefore able to be decoupled from a content stream in response to a trick play option being selected.

As illustrated in FIG. 1, various endpoint devices may be used to access content streams from the network DVR, example endpoint devices include, but are not limited to: a mobile communication device 110, such as a mobile phone; a computing device 112, such as a desktop computer, a laptop computer, etc.; a wireless computing device 114, such as a tablet computing device; a smart TV 113; or a television 116, such as an Internet-connected television or a television connected to a network-connected device, such as STB 118. An endpoint device 110, 112, 113, 114, 116 may be used to access a video player client application 108. The video player client application 108 is operable to receive an indication of a selection of a trick play option and send the request to a TSB/DVR manager 106 through the server 120.

In some embodiments, content server 104 is communicated to a server 120 where a data mining engine 122 is operable to analyze and sort the video content data and metadata. As is understood, video content data includes both visual and audio components. The channel/guide data associated with content streams may also be stored in a cache 124. The cache 124 is illustrated in FIG. 1 as a remote element, but may be integrated with the server 120 or the video player client application 108. As new information becomes available, the associated channel/guide data may be updated in the cache 124. Aspects allow for the cached associated channel/guide data to be specific to a user profile. The system 100 includes a data services system 126 which stores such information as billing data, permissions and authorization data, user profile data, etc., and its data may be stored in a user database 125. The data services system 126 is accessed by the data mining engine 122 for checking permissions and authorization data, subscriptions, and user profile data for associating channel/guide data with specific content.

Aspects allow for a TSB/DVR manager 106 to be provided within the service provider's CDN. The TSB/DVR manager 106 is operable to receive an indication of a selection of a trick play mode option, analyze the selection, and accordingly provide video frames and associated audio data as a trick play content stream for display on the endpoint device such that the local TSB 105 is decoupled from the original content stream.

The TSB/DVR manager 106 is also operable, via some aspects, to continually monitor the user's viewing patterns and the viewing behaviors with the CDN for other users in the area nearby to create content use profiles. Various methods of determining whether users are considered in the area nearby are possible, including, but not limited to: determining whether the users reside within the same ZIP code, whether the users reside in the same household, whether users are provided content from the same servers 120, whether the users are linked on a social media service, etc.

Content streams, trick play content streams, content use profiles, and other data and metadata may be stored in cloud storage 109, or may be stored at the content server 104.

According to a various aspects, a secondary screen companion device, such as a tablet with an associated content provision application, can also be used to allow the request of a trick play option on the endpoint device, such as the television 116. Other suitable means for interacting with and controlling available and received content streams include: touch commands, voice commands, gesture commands, and combinations of various functionality interface methods and systems.

FIG. 2 is a simplified block diagram illustrating one embodiment of a TSB decoupling system 200 for decoupling the local TSB 105 from content streams in response to trick play options. In the illustrated embodiment, a trick play interpretation module 220 receives an indication that a trick play has been selected and interprets how the TSB decoupling system 200 will respond. The trick play interpretation module 220 communicates the interpreted trick play option to the content sampling engine 210, which is operable to create trick play content streams based on content streams to be communicated to the content provision module 230. The content provision module 230 is in communication with the content acquisition module 240 and the content sampling engine 210, and is operable to retrieve content streams and trick play content streams to provide.

One skilled in the art will understand that various embodiments of the TSB decoupling system 200 are in communication with various computer-readable storage media, transmission media, endpoint devices, computers, servers, etc., and that the precise implementation, arrangement of, and methods of communications with these components relative to the TSB decoupling system 200 will vary accordingly without departing from the spirit and scope of the present invention.

The content provision module 230 is operable to retrieve content streams from the content acquisition module 240 and trick play content streams from the content sampling engine 210. Aspects of the content provision module 230 allow for the provision of the content stream, the trick play content stream, or a combination of the content stream and the trick play content stream. When both the content stream and the trick play content stream are to be provisioned, aspects of the content provision module 230 allow for different modes of transmission to indicate whether the content stream or the trick play content stream is to be used for current display (e.g., immediately displayed on receipt by an endpoint device, placed in a queue or TSB to be displayed, absent a change in the trick play selection, once the preceding contents of the queue or TSB are displayed, etc.) or for future display (e.g., stored for potential display independent of the display of preceding content streams or trick play content streams). Aspects of the content provision module 230 also allow for processing the content streams and trick play content streams for transmission, including, in various aspects, at least one of: adding header information, ordering content streams and trick play content streams for sequential delivery, encrypting content, etc.

The content acquisition module 240 is operable to acquire content streams in both linear and non-linear forms. As is understood in the art, linear content streams comprise content delivered in a linear time sequence, such as a transmission from a television station, a real-time video stream, etc. Non-linear content streams, in contrast, are time sequence independent and examples include: on-demand programming, pre-recorded content streams, etc. Content streams may be acquired from various sources, including, but not limited to: network storage, cable television stations, over-the-air broadcasts, the Internet, third-party storage, etc. Aspects of the content acquisition module 240 allow for a content stream to be acquired in full, in part, or in portions.

The trick play interpretation module 220 is operable to interpret trick play selections, and determine which trick play has been selected (e.g., fast forward at 5× normal speed, rewind at normal speed, pause, record, etc.). The interpreted trick play selection is then communicated to the content sampling engine 210.

The content sampling engine 210 is operable to create trick play content streams associated with content streams in response to the interpreted trick play selection. Aspects allow the trick play content streams to be created as a one-time-use trick play content stream in response to the interpreted trick play selection. Other aspects allow a trick play content stream to be saved in an optional trick play content stream module 250. The content sampling engine 210 is further operable, according to some aspects, to analyze the interpreted trick play selection in relation to the content stream and the created trick play content stream to create a content use profile associated with the content stream. The content use profile may be stored in an optional content use profile module 260.

A trick play content stream module 250 is provided in some aspects to store trick play content streams. Stored trick play content streams are retrievable by the content sampling engine 210 for reuse, which can reduce the computing resources used and network load by reducing the amount of content needed to be transferred and processed for which frequent trick play selections are made (e.g., fast forwarding through a program's opening credits, rewinding to the beginning of an action sequence, etc.).

A content use profile module 260 is provided in some aspects to store content use profiles. Content use profiles are associated with how individual users and groups of users sharing a common trait, (e.g., geographic proximity, similar viewing habits, social network links, etc.), have used trick play options in association with a content stream. Aspects of content use profiles include, but are not limited to: data relating to the frequency, length, and location in the content stream that trick play options are used, and the type of trick play options that are used. The content use profile module 260 is operable to perform an analysis of content use profiles to determine patterns of use for a content stream or related content streams (e.g., different episodes of the same program, sequels of movies, morning and evening news broadcasts from the same station, etc.). A likelihood of a trick play selection is determined by a statistical analysis of the patterns of use and the content use profiles. The likelihood of a trick play selection is communicated to the content sampling engine 210, which is operable to create (or retrieve) a trick play content stream in anticipation of a trick play selection being communicated to the content sampling engine 210 based on the determined likelihood. Different aspects give different weights to different data in the content use profile and have varying thresholds for creating (or retrieving) a predicted trick play content stream.

To create a trick play content stream conforming to the interpreted trick play selection, the content sampling engine 210 is operable to retrieve at least a portion of a content stream from the content acquisition module 240. In one example, a 2× rewind command is interpreted, and the video frames (optionally, without associated audio data) comprising the content stream are sampled, running in reverse from the start point, to create a trick play content stream comprising every other video frame of the content stream. In another example, a 5× fast forward command is interpreted, and sets of 5/25 video frames are sampled from the start point to create the trick play content stream, wherein five sequential video frames (optionally, with associated audio data) out of twenty-five video frames are sampled. In yet another example, a 10× fast forward command is interpreted, and the resolution of the content stream is reduced by a factor of 10, reducing the quality of the content stream to be provisioned, and correspondingly increasing the speed at which it can be provisioned.

Still referring to FIG. 2, if the trick play selection is interpreted to include a record option, the trick play interpretation module 220 is operable to determine a desired start point. When the desired start point is earlier in time than the currently displayed point in the content stream, such as when a user indicates that an entire 60 minute-long content stream should be recorded after watching 5 minutes of the content stream, the content sampling engine 210 is operable to create a missed-content content stream comprising the portion of the content stream between the desired start point and the currently displayed point (i.e., the 5 minutes before the trick play selection). The missed-content content stream may be stored for later provisioning (e.g., once the content stream is complete) according to some aspects, and according to other aspects it may be sent concurrently with the content stream being recording, such that the content stream is provisioned for continued viewing and recording from the currently displayed point and the missed-content content stream is provisioned in the background for future display.

FIG. 3A is an embodiment of a system 300 for providing an example user interface 310 to illustrate the decoupling of the local TSB 105 from content when the fast forward trick play option is selected. As a user may access and view a content stream from a network DVR, the TSB/DVR manager 106 accordingly manages the content stream such that a trick play content stream of the content stream is sent to the display device 320. As the user selects the fast forward trick play option button 330 on a remote control 340 to fast forward the content stream N times faster (e.g., 2×, 5×, 10×, N× faster than normal play), the TSB/DVR manager 106 may be operable to identify the user request and accordingly send another trick play content stream of the content stream.

FIG. 3B is an embodiment of a system 300 for providing an example user interface 350 to illustrate the decoupling of the local TSB 105 when the record option is selected. For example, a user may not know in advance as to which content stream may be interesting enough for the user to select to record. When a user accesses and views a content stream, the user may desire to record the content stream, after viewing it for a few minutes. As the user selects the record trick play option button 360 on a remote control 340, a user interface 350 may be provided on the display device 320 to receive a selection from the user whether to record the content stream from the beginning or from the currently-being-played time.

The user may select the "From Current Location" option 370, to record the content stream from the currently-being-played time. In that case, the TSB/DVR manager 106 manages the content stream such that the recording request is implemented to record the content from the currently-being-played time.

Alternatively, if the user selects the "From the Beginning" option 380, to record the content stream from its beginning, the TSB/DVR manager 106 accordingly manages the content stream such that the beginning point of the content stream is identified and the recording request is implemented to record the content stream from the identified beginning point. According to one aspect, the content stream is recorded from the currently-being-played time and any portion of the content stream that preceded the currently-being-played time is also recorded and has the portion of the content stream recorded from the currently-being-played time appended thereto.

In other embodiments, the user interfaces 310 and 350 contain more or fewer options, are presented in alternative arrangements, and various methods to navigate between the options are provided to the user.

Figure 4A:
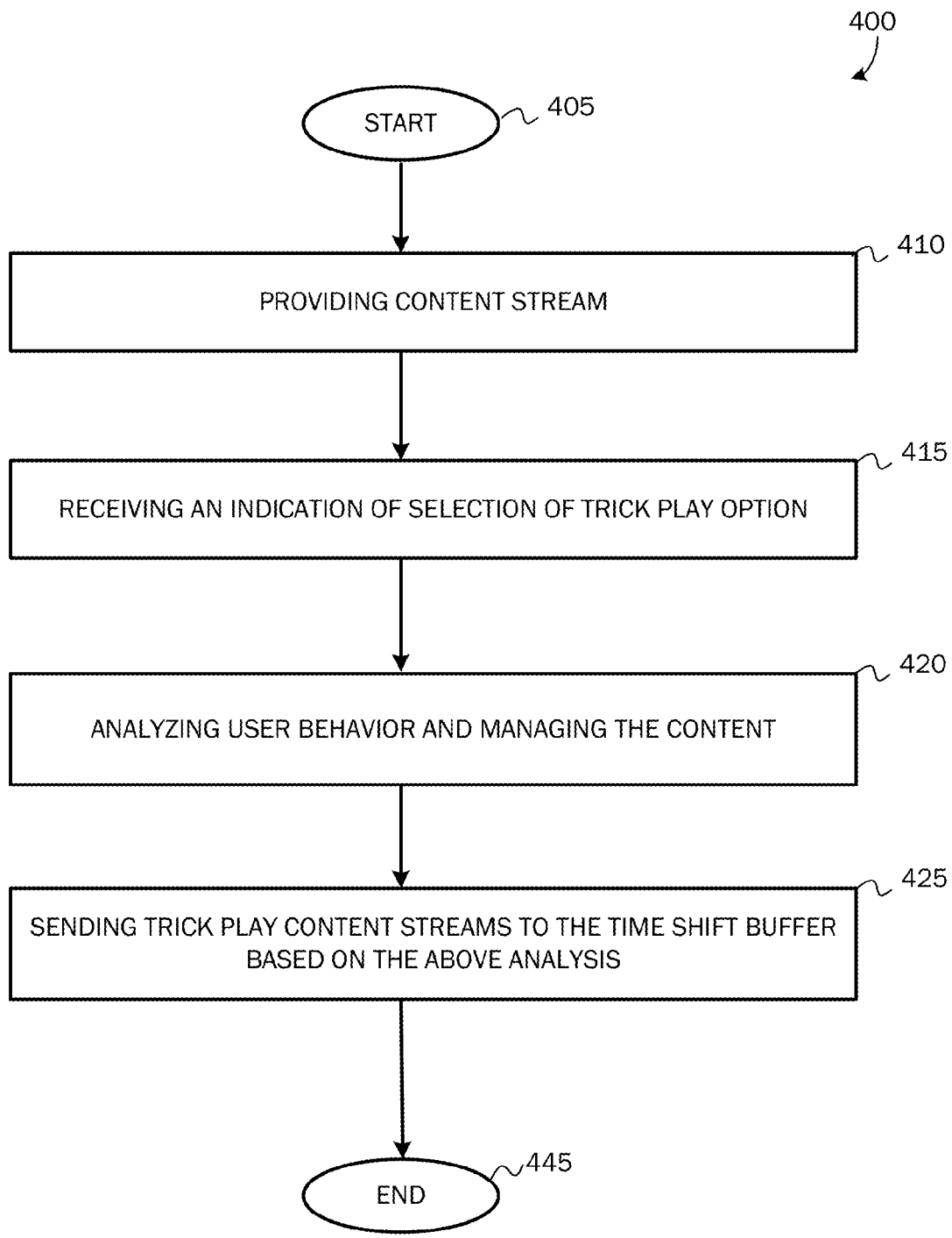
FIG. 4A is a flow chart of a method for decoupling the TSB when the fast forward trick play option is selected, according to one embodiment.

FIG. 4A is a flow chart of a method 400 for the decoupling of the local TSB 105 when a trick play option is selected, according to one embodiment. The method 400 starts at OPERATION 405 and proceeds to OPERATION 410, where video content from a network DVR is provided on the user's display device.

The method 400 then proceeds to OPERATION 415 where an indication of a selection of a trick play option, such as fast forward, is received. The method 400 then proceeds to OPERATION 420 where the user behavior is analyzed and content is managed. For example, if an indication of a selection of a fast forward trick play option is received at OPERATION 415, the profile of the video content is managed such that the speed and the quality at which the fast forward takes place on a network DVR mimics a local DVR experience, such that the speed and the quality at which the fast forward takes place is just as good as if the content were stored on a local DVR. Further, managing the content may also include storing the user behavior, such that the various trick play content streams may be sent to the local TSB 105 even before receiving an indication of a selection of a trick play option at OPERATION 415.

According to one aspect, the content use profiles generated from other users in the area nearby the user selecting trick play options relating to the content stream are also stored and used as a factor in analyzing and managing the content streams that may be sent to the local TSB 105.

The method 400 then proceeds to OPERATION 425, where the trick play content stream associated with the content stream is sent to the local TSB 105. The trick play content stream is then displayed on the display device, such that the speed and the quality at which the network trick play option takes place is closest to a local DVR experience (e.g., the user experience appears free of lag or buffering in response to trick play option selection).

Figure 4B:
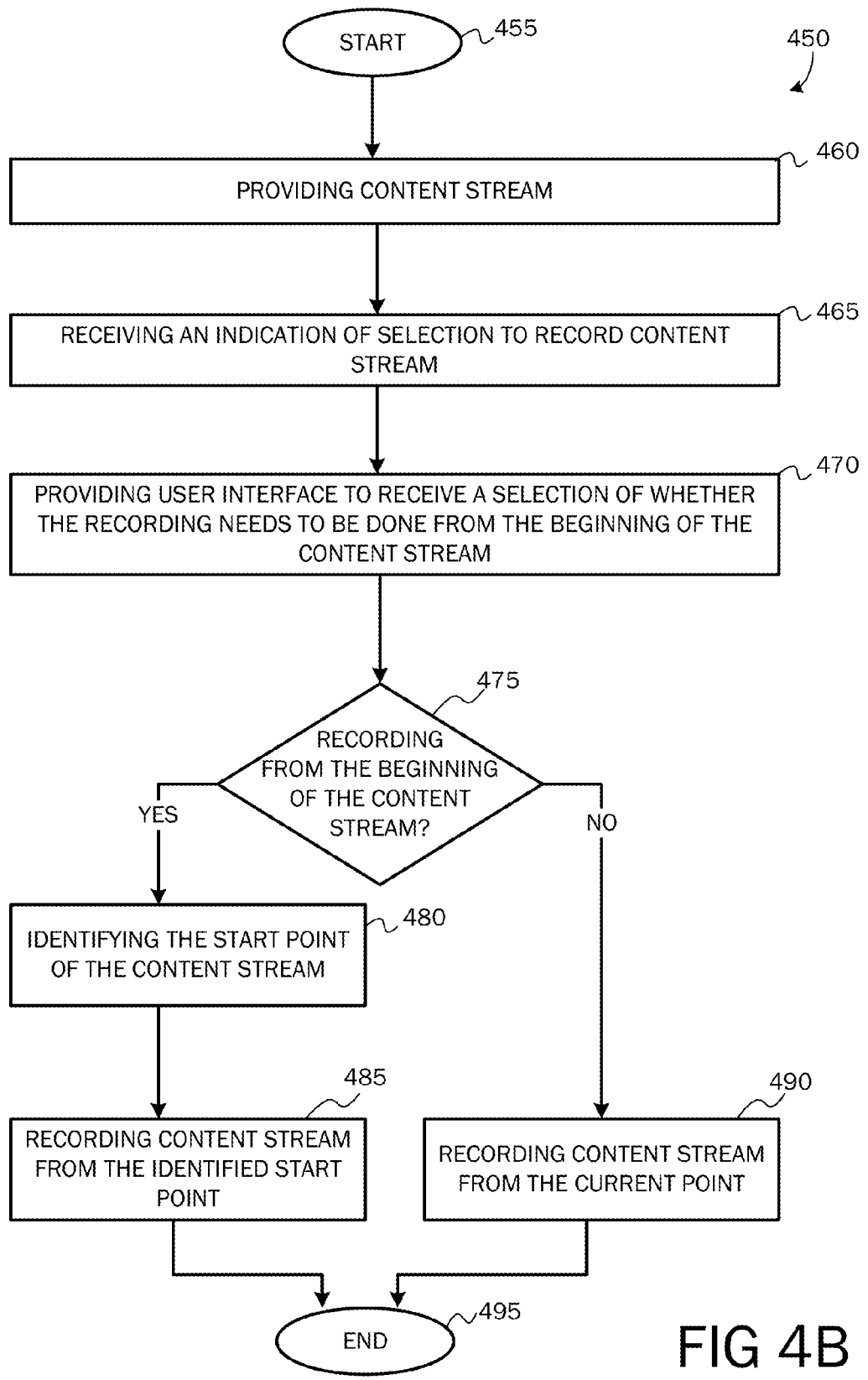
FIG. 4B is a flow chart of a method for decoupling the TSB when the record trick play option is selected, according to one embodiment.

FIG. 4B is a flow chart of a method 450 for the decoupling of the time shift buffer from the content stream when the record trick play option is selected, according to one embodiment. The method 450 starts at OPERATION 455 and proceeds to OPERATION 460, where content is delivered to the display device. The method 450 then proceeds to OPERATION 465, where an indication of selection to record the being-viewed content stream is received. The method 450 then proceeds to OPERATION 470, where a user interface 350, such as that as illustrated in FIG. 3B, is provided to receive a selection of user preference of whether the content stream is to be recorded from the beginning or from the current time. Once the user selection has been received, the method 450 proceeds to DECISION OPERATION 475, where the user selection is identified whether to record the content stream from the beginning or from the current time.

If at DECISION OPERATION 475, it is determined that the user selection is to record the content stream from the beginning, then the method 450 proceeds to OPERATION 480, where the start point of the currently-being-viewed content stream is identified and the selection to record the currently-being-viewed content stream from the identified start point is implemented at OPERATION 485. Recording from the start point is provided for both linear and non-linear content streams, for example, by creating predicted trick play content streams for the opening portion of a content stream, acquiring the portion between the start point and the currently-viewed-point from a network DVR, indicating that portions of the content stream previously provided to the local TSB 105 should be captured, etc. The method 400 ends at OPERATION 495.

Alternatively, if at DECISION OPERATION 475, it is determined that the user selection is to not record the content stream from the beginning, but from the current time, then the method 450 proceeds to OPERATION 490, where the selection to record the currently-being-viewed content stream from the current time is implemented. The method 400 ends at OPERATION 495.

Figure 5:
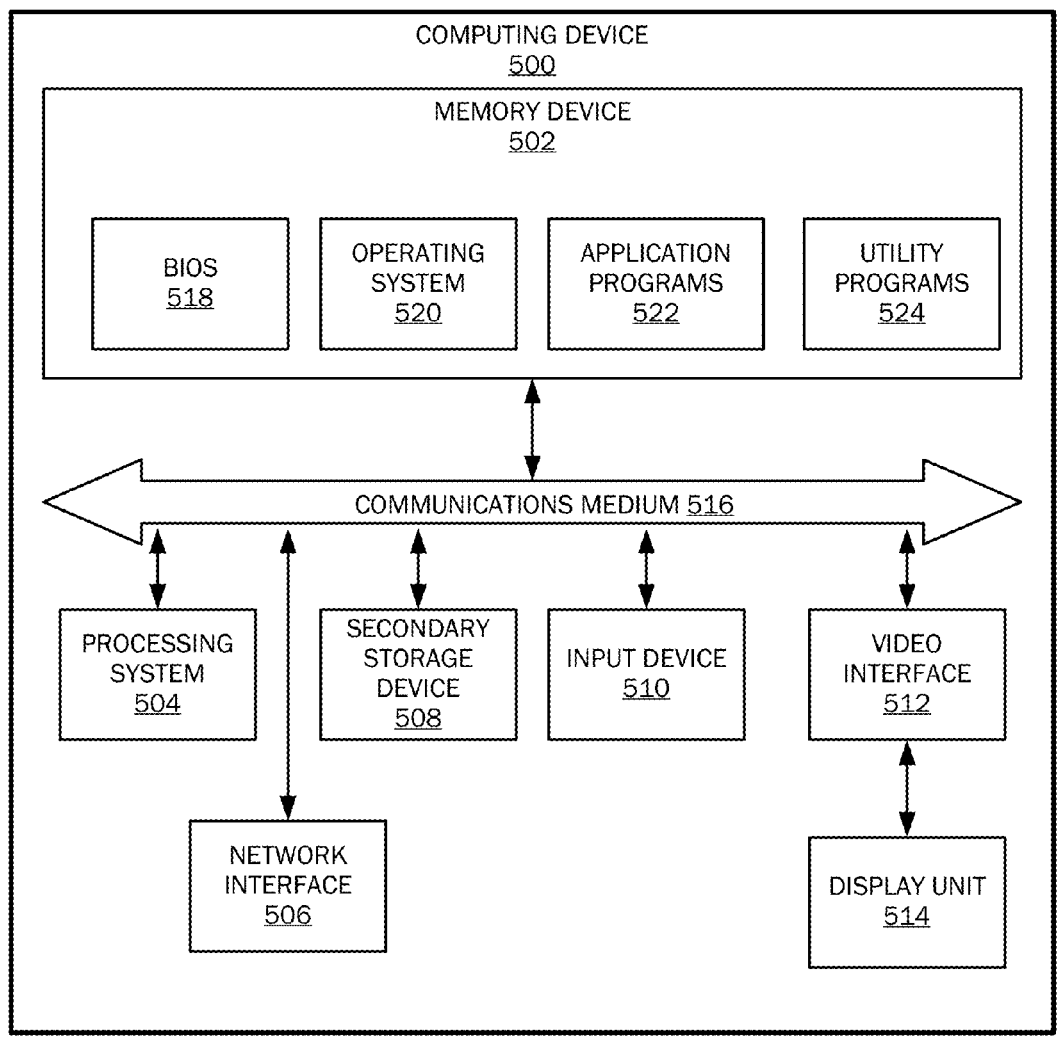
FIG. 5 is a block diagram illustrating example physical components of a computing device with which embodiments may be practiced.

FIG. 5 is a block diagram illustrating example physical components of a computing device 500 with which embodiments of the present invention may be practiced. In some embodiments, one or a combination of the components of the system 100 are implemented using one or more computing devices like the computing device 500. It should be appreciated that in other embodiments, one or a combination of the components of the system 100 may be implemented using computing devices having hardware components other than those illustrated in the example of FIG. 5.

Computing devices may be implemented in different ways in different embodiments. For instance, in the example of FIG. 5, the computing device includes a processing system 504, memory device 502, a network interface 506, a secondary storage device 508, an input device 510, a video interface 512, communicated with a display unit 514, and a communications medium 516. In other embodiments, the computing device 500 may be implemented using more or fewer hardware components or in combination with other types of computer systems and program modules. The memory device 502 includes one or more computer-readable storage media capable of storing data or computer-executable instructions. According to an aspect, the video player client application 108 is stored locally on computing device 500.

The memory device 502 includes one or more computer-readable storage media capable of storing data or computer-executable instructions. Memory device 502 thus may store the computer-executable instructions that, when executed by processing system 504, provide TSB decoupling as described with reference to FIGS. 1-4. In various embodiments, the memory device 502 is implemented in various ways. For example, the memory device 502 can be implemented as various types of computer-readable storage media. Example types of computer-readable storage media include, but are not limited to: solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices or articles of manufacture that store data.

The term computer-readable media includes transmission media and computer-readable storage media. Transmission media includes communication and information delivery media. Computer-executable instructions, data structures, and program modules may be embodied on a transmission medium. For example, transmission media can include wired media, such as a wired network or direct-wired connection, and wireless media, such as acoustic, radio frequency (RF), infrared, and other wireless media.

The term computer-readable storage medium (and its plural: computer-readable storage media) refers to devices and articles of manufacture that store data or computer-executable instructions readable by a computing device. The term computer-readable storage medium does not include transmission media. The term computer-readable storage medium encompasses volatile and nonvolatile, and removable and non-removable media implemented in various methods or technologies for storage and retrieval of information. Such information can include data structures, program modules, computer-executable instructions, or other data.

The secondary storage device 508 includes one or more computer-readable storage media, and may store data and computer-executable instructions not directly accessible by the processing system 504. That is, the processing system 504 performs an I/O operation to retrieve data or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, or other types of computer-readable storage media.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to, and receive data from, a communication network via a network interface 506. In different embodiments, the network interface 506 is implemented in different ways, such as an Ethernet interface, a token-ring network interface, a fiber optic network interface, a wireless network interface (e.g., Wi-Fi, Wi-Max, etc.), or another type of network interface. The network interface 506 may allow the device to communicate with other devices, such as over a wireless network in a distributed computing environment, a satellite link, a cellular link, and comparable mechanisms. Other devices may include computer device(s) that execute communication applications, storage servers, and comparable devices.

The input device 510 enables the computing device 500 to receive input from a user. Example types of input devices include, but are not limited to: keyboards, mice, trackballs, stylus input devices, keypads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 may be a video expansion card. In another example, the video interface 512 is integrated into a motherboard of the computing device 500. In various embodiments, the display unit 514 can be an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) connector, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory device 502, the processing system 504, the network interface 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of transmission medium.

The memory device 502 stores various types of data or software instructions. For instance, in the example of FIG. 5, the memory device 502 stores a Basic Input/Output System (BIOS) 518 and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory device 502 also stores one or more application programs 522 that, when executed by the processing system 504, cause the computing device 500 to provide applications to users, for example, the video player client application 108. The memory device 502 also stores one or more utility programs 524 that, when executed by the processing system 504, cause the computing device 500 to provide utilities to other software programs.

Embodiments of the present invention may be used in various distributed computing environments where tasks are performed by remote processing devices that are linked through a communications network in a distributed computing environment.

Figure 6:
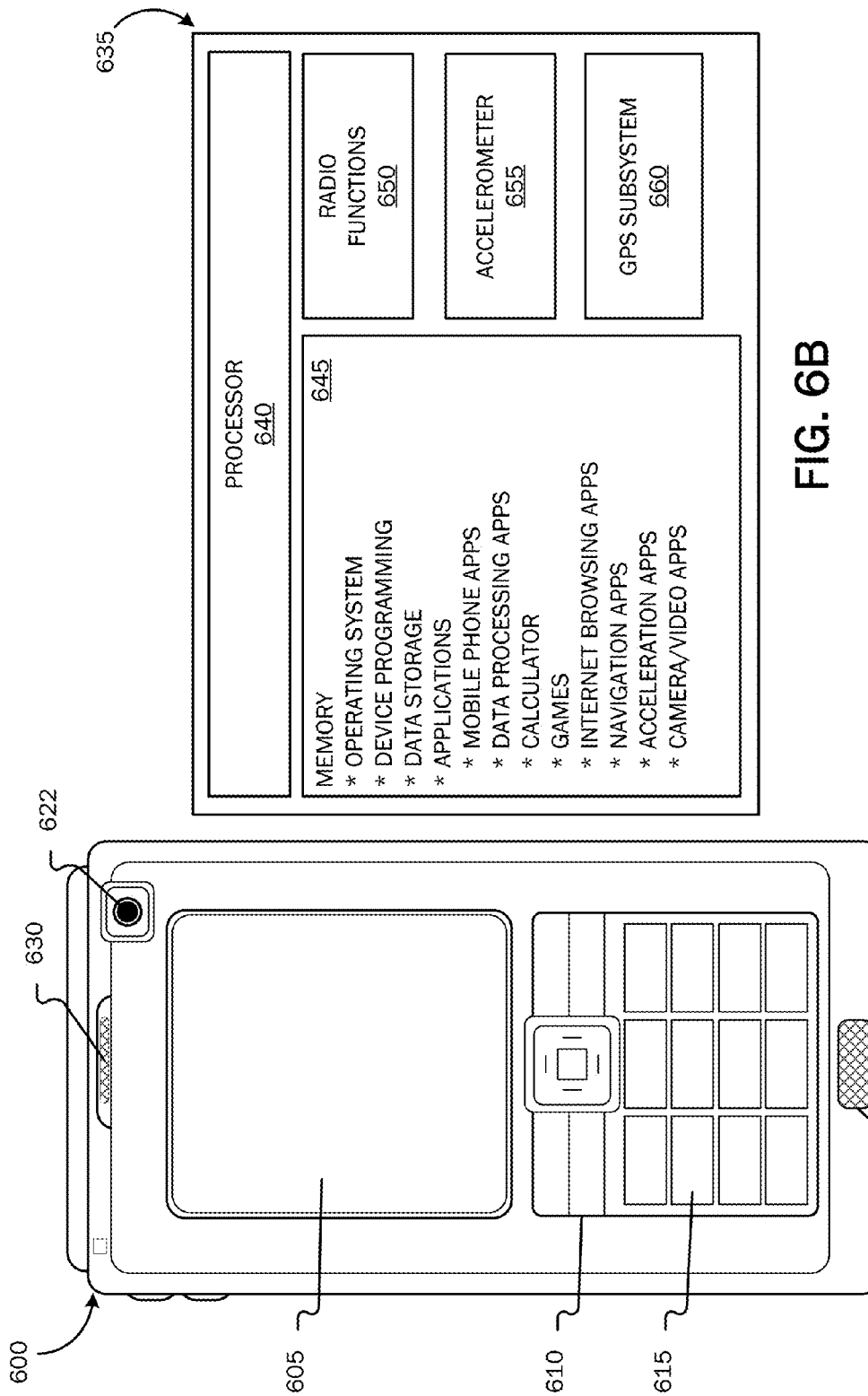
FIGS. 6A-6B illustrate a suitable mobile computing environment with which embodiments may be practiced.

FIGS. 6A and 6B illustrate a suitable mobile computing environment, for example, a mobile computing device 600 embodied as a mobile phone 110, a tablet personal computer 114, a laptop computer 112, and the like, with which embodiments may be practiced. The mobile computing device 600 is illustrative of any suitable device operative to send, receive and process wireless communications according to embodiments of the present invention. A display screen 605 is operative for displaying a variety of information such as information about incoming and outgoing communications, as well as, a variety of data and displayable objects, for example, text, alphanumeric data, photographs, and the like.

Data input to the mobile computing device 600 may be performed via a variety of suitable means, such as, touch screen input via the display screen 605, keyboard or keypad input via a data entry area 610, key input via one or more selectable buttons or controls 615, voice input via a microphone 618 disposed on the mobile computing device 600, photographic input via a camera 622 functionality associated with the mobile computing device, or any other suitable input means. Data may be output via the mobile computing device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a general purpose computer processor for processing incoming and outgoing data and communications and controlling operation of the device and associated software applications via a mobile computing device operating system. Memory 645 may be used for storing a device operating system, device programming, one or more stored applications, for example, mobile telephone applications, data processing applications, the video player client application 108, calculators, games, Internet browsing applications, navigation applications, acceleration applications, camera or video applications, etc.

Mobile computing device 600 may contain an accelerometer 655 for detecting acceleration, and can be used to sense orientation, vibration, or shock. Mobile computing device 600 may contain a global positioning system (GPS) subsystem (e.g., GPS send/receive functionality) 660. A GPS subsystem 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennas, for allowing the mobile computing device 600 to communicate with other communication devices and systems via a wireless network. Radio functions 650 may be used to communicate with a wireless or WIFI-based positioning system to determine the location of a mobile computing device 600.

Figure 7:
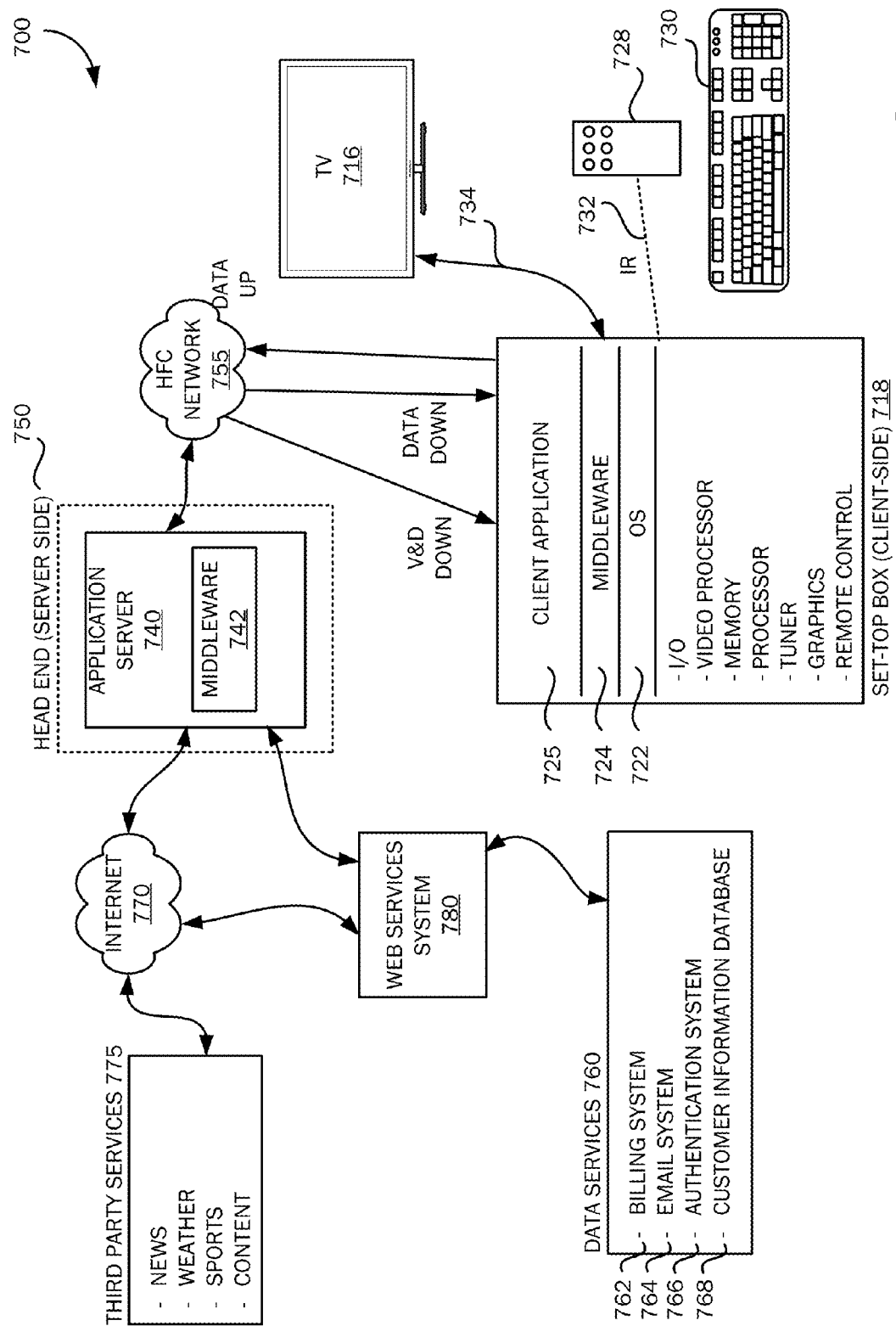
FIG. 7 is a simplified block diagram illustrating one embodiment of a cable television services system providing video client social media account creation and linking of the video client social media account creation to a video services subscription account.

FIG. 7 is a simplified block diagram illustrating one embodiment of a cable television services (CATV) system 700 providing an operating environment. As can be appreciated, a CATV architecture 700 is but one of various types of systems that may be used to provide the embodiments of the present invention. Referring now to FIG. 7, digital and analog video programming, information content and interactive television services are provided via a hybrid fiber coax (HFC) network 755 to a television set 716 for consumption by a CATV customer. As is known to those skilled in the art, HFC networks 755 combine both optical fiber and coaxial cable lines. Typically, optical fiber runs from the cable head end 750 to neighborhoods of subscribers. Coaxial cable runs from the optical fiber feeders to each customer or subscriber. The functionality of the HFC network 755 allows for efficient bidirectional data flow between the client-side set-top box 718 and a server-side application server 740.

The CATV system 700 is in the form of a distributed client-server computing system for providing video and data flow across the HFC network 755 between server-side services providers (e.g., cable television/services providers) via a server-side head end 750 and a client-side customer via STB 718 in communication with a customer receiving device, such as the television set 716. As is understood by those skilled in the art, modern CATV systems 700 may provide a variety of services across the HFC network 755 including traditional digital and analog video programming, telephone services, high speed Internet access, video-on-demand, and information services.

On the client side of the CATV system 700, digital and analog video programming, and digital and analog data are provided to the customer television set 716 via the STB 718. Interactive television services that allow a customer to input data to the CATV system 700 likewise are provided by the STB 718. As illustrated in FIG. 7, the STB 718 is a multipurpose computing device having a computer processor, memory, and an input/output mechanism. The input/output mechanism receives input from server-side processes via the HFC network 755 and from customers via input devices such as the remote control device 728, keyboard 730, or other computing device, such as a tablet/slate computer, mobile computing device, etc. The remote control device 728 and the keyboard 730 may communicate with the STB 718 via a suitable communication transport such as the infrared connection 732. The STB 718 also includes a video processor for processing and providing digital and analog video signaling to the television set 716 via a cable communication transport 734. A multi-channel tuner is provided for processing video and data to and from the STB 718 and the server-side head end system 750, described below.

The STB 718 also includes an operating system 722 for directing the functions of the STB 718 in conjunction with a variety of client applications 725. For example, if a client application 725 requires a news flash from a third-party news source to be displayed on the television set 716, the operating system 722 may cause the graphics functionality and video processor of the STB 718, for example, to output the news flash to the television set 716 at the direction of the client application 725 responsible for displaying news items.

Because a variety of different operating systems 722 may be used by a variety of different brands and types of set-top boxes 718, a middleware layer 724 may be provided to allow a given software application to be executed by a variety of different operating systems 722. According to an aspect, the middleware layer 724 may include a set of application programming interfaces (APIs) that are exposed to client applications 725 and operating systems 722 that allow the client applications to communicate with the operating systems 722 through common data calls understood via the API set. As described below, a corresponding middleware layer 742 is included on the server side of the CATV system 700 for facilitating communication between the server-side application server 740 and the client-side STB 718. The middleware layer 742 of the server-side application server 740 and the middleware layer 724 of the client-side STB 718 may format data passed between the client side and server side according to the Extensible Markup Language (XML).

According to one aspect, the STB 718 passes digital and analog video and data signaling to the television set 716 via a one-way communication transport 734. According to other aspects, two-way communication transports may be used, for example, via high definition multimedia (HDMI) ports. The STB 718 may receive video and data from the server side of the CATV system 700 via the HFC network 755 through a video/data downlink and data via a data downlink. The STB 718 may transmit data from the client side of the CATV system 700 to the server side of the CATV system 700 via the HFC network 755 via one data uplink. The video/data downlink is an "in band" downlink that allows for digital and analog video and data signaling from the server side of the CATV system 700 through the HFC network 755 to the STB 718 for use by the STB 718 and for distribution to the television set 716. As is understood by those skilled in the art, the "in band" signaling space operates at a relative high frequency, e.g., between 54 and 400 megahertz. The signaling space is generally divided into 6 megahertz channels in which may be transmitted as a single analog signal or a greater number (e.g., ten) of digital signals.

The data downlink and the data uplink, illustrated in FIG. 7, between the HFC network 755 and the STB 718 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side STB 718 and the server-side application server 740 is typically passed through the "out of band" data links. Alternatively, an "in band" data carousel may be positioned in an "in band" channel into which a data feed may be processed from the server-side application server 740 through the HFC network 755 to the client-side STB 718. Operation of data transport between components of the CATV system 700, described with reference to FIG. 7, is well known to those skilled in the art.

Referring still to FIG. 7, the head end 750 of the CATV system 700 is positioned on the server side of the CATV system 700 and includes hardware and software systems responsible for originating and managing content for distributing through the HFC network 755 to client-side STBs 718 for presentation to customers via television sets 716. As described above, a number of services may be provided by the CATV system 700, including digital and analog video programming, interactive television services, telephone services, video-on-demand services, targeted advertising, and provision of information content.

The application server 740 is a computing system operative to assemble and manage data sent to and received from the client-side STB 718 via the HFC network 755. As described above with reference to the STB 718, the application server 740 includes a middleware layer 742 for processing and preparing data from the head end 750 of the CATV system 700 for receipt and use by the client-side STB 718. For example, the application server 740 via the middleware layer 742 may obtain data from third-party services 775 via the Internet 770 for transmitting to a customer through the HFC network 755 and the STB 718. For example, content data and metadata of a third party service 775 may be downloaded by the application server 740 via the Internet 770. When the application server 740 receives the downloaded third party services 775, the middleware layer 742 may be used to format the content metadata for receipt and use by the STB 718. Therefore, content metadata may be sent and categorized based on the availability to the customer's program guide data According to one aspect, data obtained and managed by the middleware layer 742 of the application server 740 is formatted according to the Extensible Markup Language and is passed to the STB 718 through the HFC network 755 where the XML-formatted data may be used by a client application 725 in concert with the middleware layer 724, as described above. As should be appreciated by those skilled in the art, a variety of third-party services data 775, including news data, weather data, sports data and other information content may be obtained by the application server 740 via distributed computing environments such as the Internet 770 for provision to customers via the HFC network 755 and the STB 718.

According to aspects, the application server 740 obtains customer support services data, including billing data, information on customer work order status, answers to frequently asked questions, services provider contact information, and the like from data services 760 for provision to the customer via an interactive television session. As illustrated in FIG. 7, the services provider data services 760 include a number of services operated by the services provider of the CATV system 700, which may include data on a given customer.

A billing system 762 may include information such as a customer's name, street address, business identification number, Social Security number, credit history, and information regarding services and products subscribed to by the customer. According to aspects, the billing system 762 may also include billing data for services and products subscribed to by the customer for bill processing, billing presentment and payment receipt.

An email system 764 may include information such as user accounts, address books, archived messages, subscriber profiles, subscribers IDs, and passwords used by customers for access to electronic mail services.

An authentication system 766 may include information such as secure user names, subscriber profiles, subscriber IDs, and passwords used by customers for access to network services.

A customer information database 768 may include general information about customers such as place of employment, business address, business telephone number, and demographic information such as age, gender, educational level, and the like. The customer information database 768 may also include information on pending work orders for services or products ordered by the customer. The customer information database 768 may also include general customer information such as answers to frequently asked customer questions and contact information for various service provider offices/departments. As should be understood, this information may be stored in a variety of disparate databases operated by the cable services provider.

As should be understood by those skilled in the art, the disparate systems 762, 764, 766, 768 may be integrated or provided in any combination of separate systems, wherein FIG. 7 shows only one example.

Referring still to FIG. 7, web services system 780 is illustrated between the application server 740 and the data services 760. According to aspects, web services system 780 serves as a collection point for data requested from each of the disparate data services systems comprising data services 760. According to aspects, when the application server 740 requires customer services data from one or more of the data services 760, the application server 740 passes a data query to the web services system 780. The web services system formulates a data query to each of the available data services systems 760 for obtaining any required data for a requesting customer as identified by an STB-identification associated with the customer. The web services system 780 serves as an abstraction layer between the various data services systems 760 and the application server 740. That is, the application server 740 is not required to communicate with the disparate data services systems 760, nor is the application server 740 required to understand the data structures or data types used by the disparate data services systems 760. The web services system 780 is operative to communicate with each of the disparate data services systems 760 for obtaining necessary customer data. The customer data obtained by the web services system 780 is assembled and is returned to the application server 740 for ultimate processing via the middleware layer 742, as described above.

Embodiments the invention may be used in combination with any number of computer systems, such as in desktop environments, laptop or notebook computer systems, multiprocessor systems, micro-processor based or programmable consumer electronics, networked PCs, mini computers, mainframe computers, mobile communication device systems and the like. Embodiments of the present invention may be used in various distributed computing environments where tasks are performed by remote processing devices that are linked through a communications network in a distributed computing environment, and where programs may be located in both local and remote memory storage.

Embodiments, for example, are described above with reference to block diagrams or operational illustrations of methods, systems, and computer program products according to embodiments. The functions/acts noted in the blocks may occur out of the order as shown in any flowchart or described herein with reference to the Figures. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering, inserting, or deleting a step or process, without departing from the embodiments.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for decoupling a time shift buffer from a content stream to optimize a trick play experience, the method comprising:

providing a content stream from a server to an endpoint device;

anticipating a trick play selection at the endpoint device;

generating a trick play content stream based on the anticipated trick play selection before receiving the trick play selection from the endpoint device;

receiving, by the server, the trick play selection at the endpoint device;

in response to receiving the trick play selection, decoupling a time shift buffer at the endpoint device from the content stream; and providing the trick play content stream to the time shift buffer at the endpoint device, the endpoint device remote from the server.

2. The method of claim 1, further comprising:

analyzing a user behavior in relation to the content stream, further comprising:

storing a user data;

comparing a plurality of stored user data from a corresponding plurality of users;

statistically analyzing the compared plurality of stored user data;

creating a content use profile based on the statistical analysis; and associating the content use profile with the trick play selection to predict a future trick play selection; and in response to the predicted future trick play selection, acquiring the trick play content stream.

3. The method of claim 1, wherein the trick play content stream comprises a portion of the content stream having a reduced quality.

4. The method of claim 3, wherein the reduced quality of the portion of the content stream is reduced from an original quality by reducing a resolution of the content stream.

5. The method of claim 3, wherein the reduced quality of the portion of the content stream is reduced from an original quality by sampling a plurality of video frames and associated audio data from the content stream to comprise the trick play content stream.

6. The method of claim 5, further comprising:

calculating a first trick play content stream video frame, wherein the first trick play content stream video frame comprises a video frame from the content stream corresponding to a video frame stored locally in the time shift buffer of the endpoint device; and calculating a subsequent trick play content stream video frame, wherein the subsequent trick play content stream video frame comprises a video frame from the content stream corresponding to a video frame not stored locally in the time shift buffer of the endpoint device.

7. The method of claim 1, further comprising:

when the trick play selection comprises a record command;

providing a user interface operable to transmit an indication of a desired start point; and in response to the indication of the desired start point, storing at least a portion of the content stream corresponding with the desired start point on a computer-readable storage medium.

8. The method of claim 7, wherein the desired start point is a beginning of the content stream, and wherein the beginning of the content stream is not stored locally by the endpoint device when the trick play selection is received.

9. A system for decoupling a time shift buffer from a content stream to optimize a trick play experience comprising:

a memory device, including computer readable instructions; and a processor in communication with the memory device, operable to execute the computer readable instructions, the computer readable instructions programmed to:

acquire a content stream;

anticipate a trick play selection;

create a trick play content stream associated with the content stream based on the anticipated trick play selection before receiving the trick play selection from an endpoint;

receive the trick play selection;

provide the content stream to the endpoint, the endpoint being remote from the processor and memory;

decouple a time shift buffer at the endpoint from the content stream in response to receipt of the trick play selection; and provide the trick play content stream to the time shift buffer in the endpoint.

10. The system of claim 9, wherein the computer readable instructions are further programmed to create the trick play content stream of the content stream by sampling a plurality of video frames of the content stream.

11. The system of claim 9, wherein the computer readable instructions are further programmed to determine a transmission mode for the trick play content stream, wherein the mode enables one of:

transmitting only the content stream;

transmitting only the trick play content stream;

transmitting the content stream for current display and transmitting the trick play content stream for future display;

transmitting the content stream for future display and transmitting the trick play content stream for current display; and transmitting the content stream for future display and transmitting the trick play content stream for future display.

12. The system of claim 9, wherein the trick play content stream is stored in the memory device.

13. The system of claim 9, wherein the computer readable instructions are further programmed to generate a content use profile associated with the content stream, the content use profile being stored in the memory device.

14. The system of claim 13, wherein the computer readable instructions are further programmed to create the trick play content stream based on a statistical analysis of the content use profile associated with the content stream.

15. The system of claim 9, when the trick play selection is a record option, the computer readable instructions are further programmed to:

interpret a start point of the content stream;

interpret a currently displayed point in the content stream when the record option is received;

determine whether the start point precedes the currently displayed point in the content stream;

when the start point precedes the currently displayed point in the content stream, create a missed-content content stream comprising a portion of the content stream between the start point and the currently displayed point; and provide the missed-content content stream to be recorded.

16. The system of claim 15, wherein the content stream is recorded from the currently displayed point and the recorded content stream is appended to the missed-content content stream.

17. A computer-readable storage medium containing non-transitory computer executable instructions, which, when executed by a computer, perform a method for decoupling a time shift buffer to optimize a trick play experience, the method executed by the computer executable instructions comprising:

providing a content stream via a network to an endpoint device, the endpoint device including a time shift buffer;

anticipating a trick play selection at the endpoint device;

generating a trick play content stream based on the anticipated trick play selection before receiving the trick play selection from the endpoint device, wherein the trick play content stream comprises a plurality of video frames and associated audio data selected from the content stream to comprise the trick play content stream, wherein a first selected video frame of the trick play content stream comprises a video frame from the content stream corresponding to a video frame stored locally in the time shift buffer of the endpoint device;

receiving, via the network, the trick play selection at the endpoint device;

in response to the received trick play selection, decoupling the time shift buffer of the endpoint device from the content stream; and providing the trick play content stream over the network to the time shift buffer of the endpoint device.

18. The computer-readable storage medium of claim 17, wherein the method executed by the computer executable instructions further comprises:

storing the trick play selection in relation to the content stream as a user data, further comprising:

noting a play mode, a location in the content stream, and a duration of the trick play selection in relation to the content stream within the user data;

storing the user data;

comparing a plurality of stored user data from a corresponding plurality of users;

statistically analyzing the compared plurality of stored user data;

creating a content use profile based on the statistical analysis; and associating the content use profile with the trick play selection to predict a future trick play selection; and in response to the predicted future trick play selection, acquiring the trick play content stream.

19. The computer-readable storage medium of claim 17, when the trick play selection comprises a record command:

providing a user interface operable to transmit an indication of a desired start point; and in response to the indication of the desired start point, storing the content stream from the desired start point onward onto a computer-readable storage medium.

20. The computer-readable storage medium of claim 19, wherein the desired start point is a beginning of the content stream, and wherein the beginning of the content stream is not stored locally by the endpoint device when the trick play selection is received.

* * * * *